United States Patent [19]

Quiros et al.

[11] Patent Number: 4,734,930
[45] Date of Patent: Mar. 29, 1988

[54] VOICE RECORDING APPARATUS

[76] Inventors: Alvaro Quiros, 1811 Southpointe Dr., Sarasota, Fla. 33581; Charles E. Murphy, 3717 Riviera Dr., Sarasota, Fla. 33582

[21] Appl. No.: 60,968

[22] Filed: Jun. 17, 1987

Related U.S. Application Data

[63] Continuation of Ser. No. 926,887, Nov. 6, 1986, abandoned, which is a continuation of Ser. No. 675,107, Nov. 26, 1984, abandoned.

[51] Int. Cl.$^4$ .............................................. H04M 3/50
[52] U.S. Cl. ...................................... 379/88; 379/214
[58] Field of Search .................... 379/88, 84, 67, 201, 379/213, 214

[56] References Cited

U.S. PATENT DOCUMENTS

| | | | |
|---|---|---|---|
| 4,066,847 | 1/1978 | Giordano | 379/82 |
| 4,359,607 | 11/1982 | Hannig et al. | 379/88 |
| 4,518,827 | 5/1985 | Sagara | 379/88 |
| 4,623,761 | 11/1986 | Winter et al. | 379/84 |

Primary Examiner—Thomas W. Brown
Attorney, Agent, or Firm—Davis Hoxie Faithfull & Hapgood

[57] ABSTRACT

Voice recording apparatus includes full duplex communication between the operator's telephone set and the PBX switching matrix, and digital signal recording circuitry, for selectably presenting the operator's actual voice or the recorded voice message to the PBX in response to operator selection.

5 Claims, 12 Drawing Figures

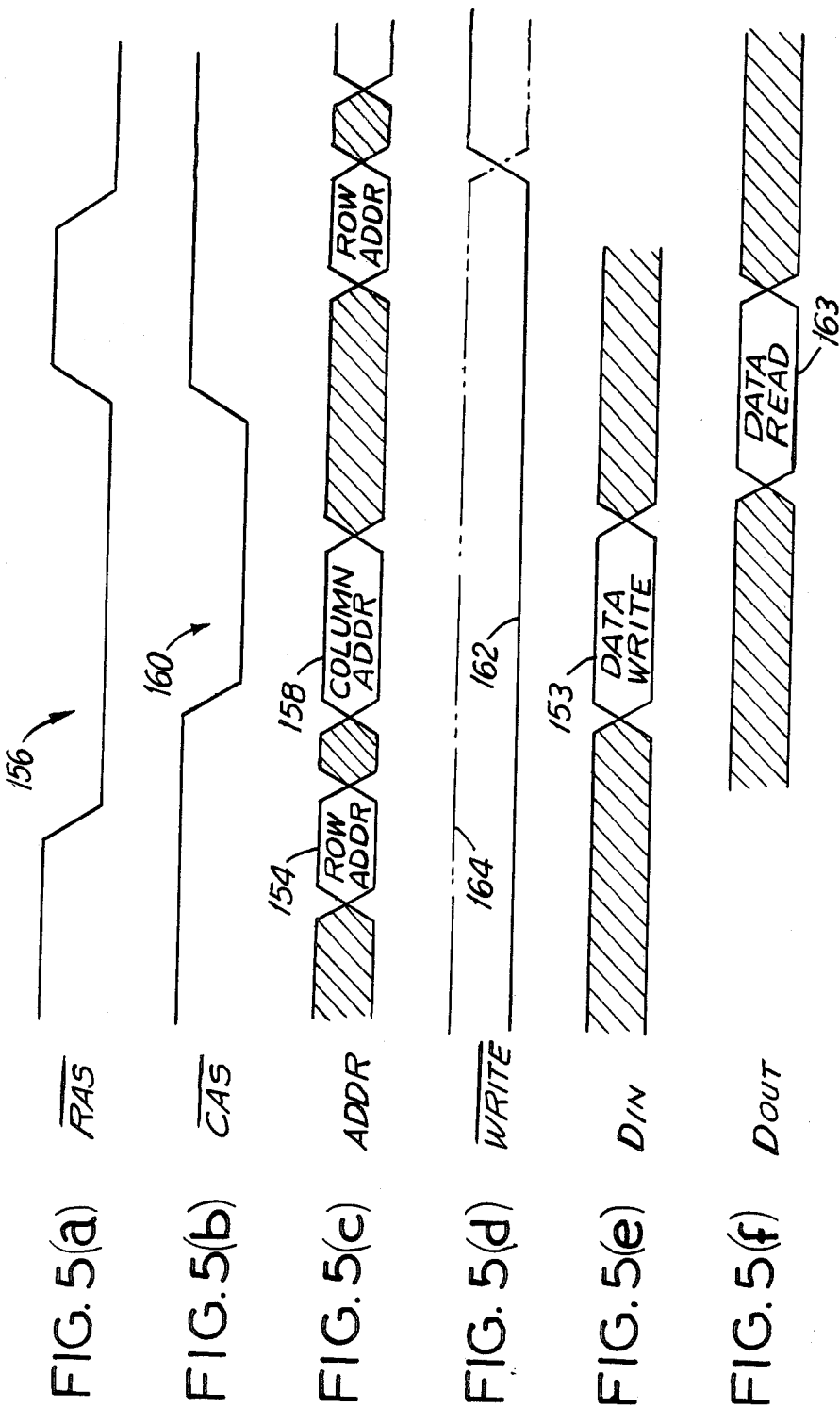

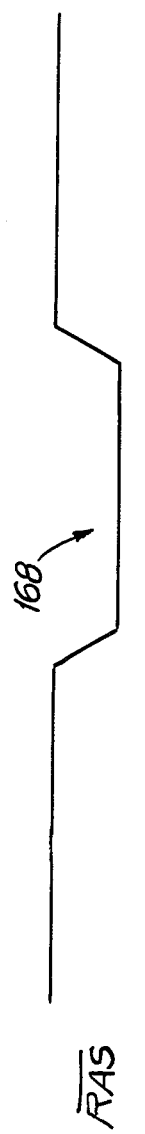
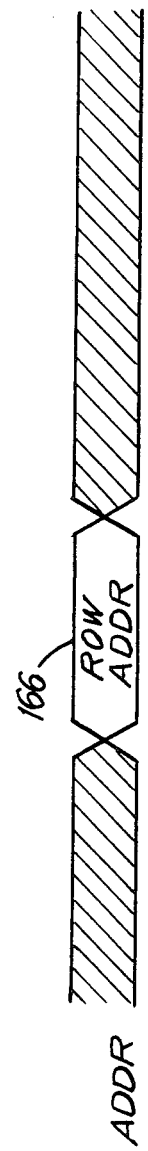

VOICE RECORDING APPARATUS

This application is a continuation of application Ser. No. 926,887, filed Nov. 6, 1986 which is a continuation of application Ser. No. 675,107, filed Nov. 26, 1984.

TECHNICAL FIELD

This invention relates to voice recording apparatus, and more particularly to voice recording apparatus for use with PBX telephone systems.

BACKGROUND ART

All major business establishments have a receptionist/operator who responds to incoming telephone calls to the establishment's central telephone exchange (CENTREX) or, in the case of a private branch exchange (PBX), answers incoming calls to the PBX main number. Telephone answering protocol requires that the operator respond to each incoming call with some type of salutation, i.e. a greeting identifying the answering party. Generally the greeting is a common two to three second long phrase, such as "Good morning, ABC Manufacturing Company". In some instances, such as law partnership offices the greeting may be longer, such as "Good morning, Smith, Jones, Brown and Green . . .".

This common greeting may be repeated four hundred to a thousand times or more during the operator's workshift. As such it may be difficult to maintain voice freshness throughout the workshift, especially toward the end of the shift when fatigue may result in a less than pleasant greeting. An obvious solution would be to provide a recorded announcement which could be used for each incoming call.

Mechanical recordings, however, present a number of different operating problems. First, the mechanical tape recording device must be repeatedly rewound/played for each call. Secondly, the sound fidelity of the mechanical recording device does not always sound natural. If the recording is different from the operator's actual voice, there is a likelihood that the caller will be able to discriminate between the recorded message and the live operator's voice, thereby generating confusion. Ideally, the recorded greeting will be indistinguishable to the calling party.

DISCLOSURE OF INVENTION

The object of the present invention is to provide an operator interactive, high fidelity voice recording apparatus for use with a PBX telephone system.

According to the present invention, voice recording apparatus includes an analog signal input/output (I/O) interface for providing full duplex communication between the operator's telephone set and the PBX switching matrix, and includes digital signal recording circuitry for selectably recording a digital signal message equivalent of the operator's voice in random access memory (RAM), the analog I/O presenting the operator's actual voice communication or the recorded voice message to the PBX in response to operator selection. In further accord with the present invention, the voice recording apparatus is operator actuated for both message recording and message playback, and playback messages may be talked over by the operator at all times.

In still further accord with the present invention, the digital signal recorder includes an adaptive delta modulation (ADM) codec, a signal processor with operating system software, and dynamic random access memory (DRAM), the codec encoding the operator recorded message into serial bit ADM format for storage in DRAM and decoding the stored ADM signal for recorded message playback, the signal processor operating system software incorporating the DRAM memory refresh cycle function and the address multiplexing function, thereby minimizing the required control hardware.

The voice recording apparatus of the present invention is a compact digital voice recorder which may be installed in line, between the operator headset and PBX console. Voice message recording is provided using adaptive delta modulation techniques and dynamic random access memories, to provide realistic, and distortion free message recording and playback. The DRAM memory refresh and address multiplexing function is incorporated in the digital recorder's operating system' software, minimizing circuit hardware.

These and other objects, features and advantages of the present invention will become more apparent in light of the following detailed description of a best mode embodiment thereof, as illustrated in the accompanying Drawing.

BRIEF DESCRIPTION OF THE DRAWING

FIGS. 5(a)-5(f) illustrate waveforms used in the description of operation of the embodiment of FIG. 2; and FIGS. 6(a)-6(b) illustrate a second set of signal waveforms used in the description of operation of the embodiment of FIG. 2.

BEST MODE FOR CARRYING OUT THE INVENTION

Figure 1:
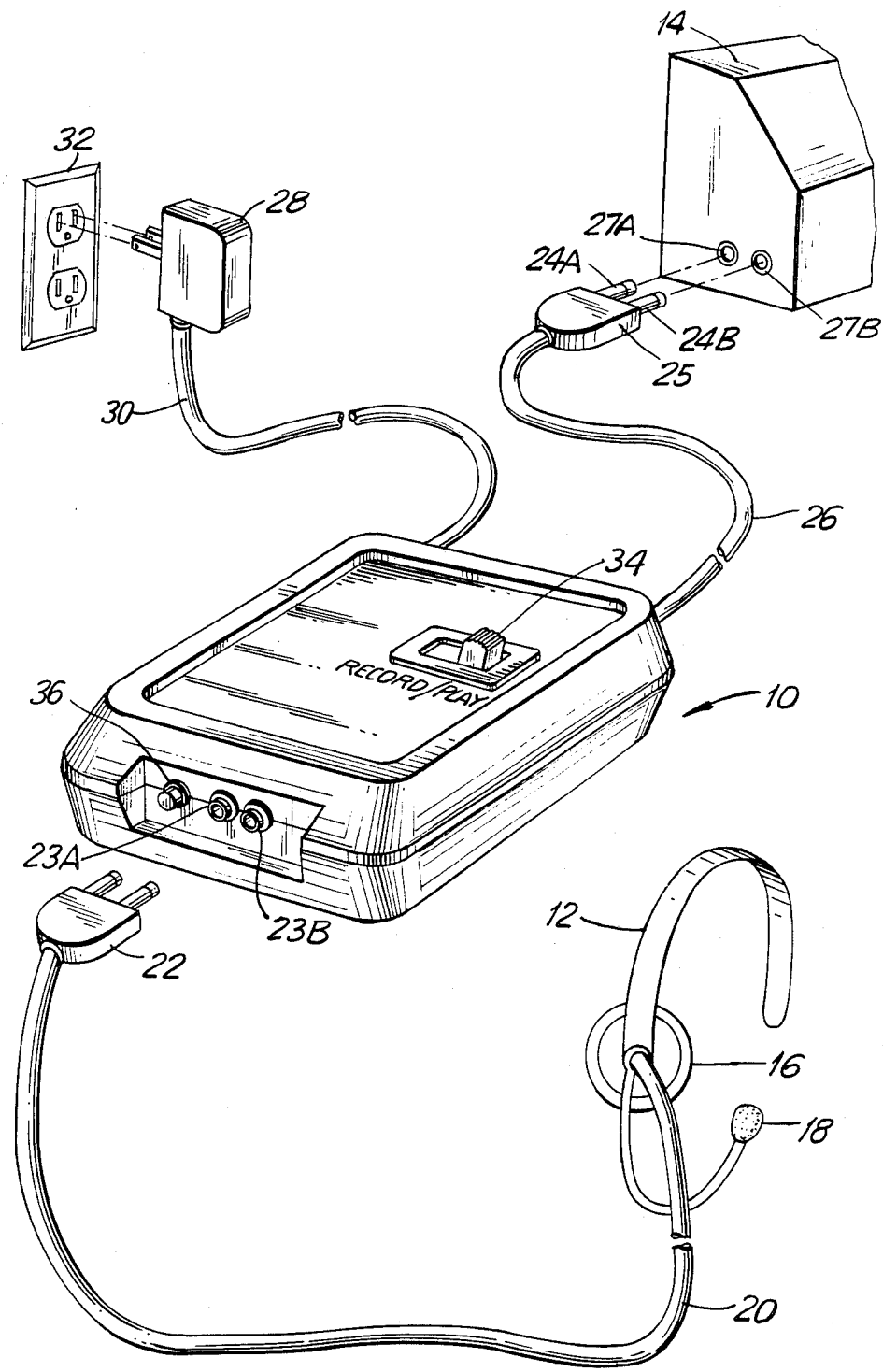
FIG. 1 is a perspective illustration of the voice recording apparatus of the present invention.

FIG. 1 is a perspective illustration of the voice recording apparatus 10 of the present invention. The apparatus is shown interconnected between an operator's PBX headset 12 and the operator's PBX console 14. The headset 12 is only illustrative. It includes an earpiece 16 and microphone 18 mounted to a headset frame. Any of the various other known types of headsets, or telephone handsets may be used.

The headset is connected through a standard four wire conductor 20 and two prong connector 22 to the headset inputs 23A, 23B of the recording apparatus 10. The apparatus, in turn, is connected through a two prong (24A, 24B) connector 25 and four wire conductor 26 into headset input 27A, 27B of the PBX console. In this manner the recorder is interconnected between the headset and console; exchanging information between the operator and the PBX console. Electrical power to the recording apparatus may be provided through a wall mounted transformer 28 and power cord 30 connected into a standard 115 VAC, 60 Hz outlet 32.

The voice recording apparatus includes at least two operator actuated switches: a dual position RECORD/PLAY mode switch 34, and an actuating switch 36. The RECORD/PLAY switch selects either a voice recording mode (RECORD) or a playback mode (PLAY).

The switch 36 actuates the selected mode. Preferably the switch 36 is a "push to actuate" switch which automatically deactuates upon release.

As described in detail hereinafter, selecting the RECORD position and depressing and holding the actuate switch 36 allows the operator to record voice messages. Repositioning the switch 34 to the PLAY position provides playback of the recorded message upon depression of the actuate switch. Typically the recorded message is a greeting identifying the called party.

In operation, the operator has the option of answering each incoming call to the PBX with a "live" greeting or with the recorded greeting, followed by live operator dialog. A failure of the recording device has no effect on normal operator/PBX operation. The voice messages may be recorded at frequent intervals, or when a new operator comes on shift, so that the recorded message emulates the tonal quality of the operator's actual voice throughout a given time period. This makes the recorded voice indistinguishable from the operator's actual voice, while saving the operator's voice in answering repetitive calls. This may be a significant voice saving measure where the greeting message is lengthy, as in professional firms where identification requires surname recitation.

Figure 2:
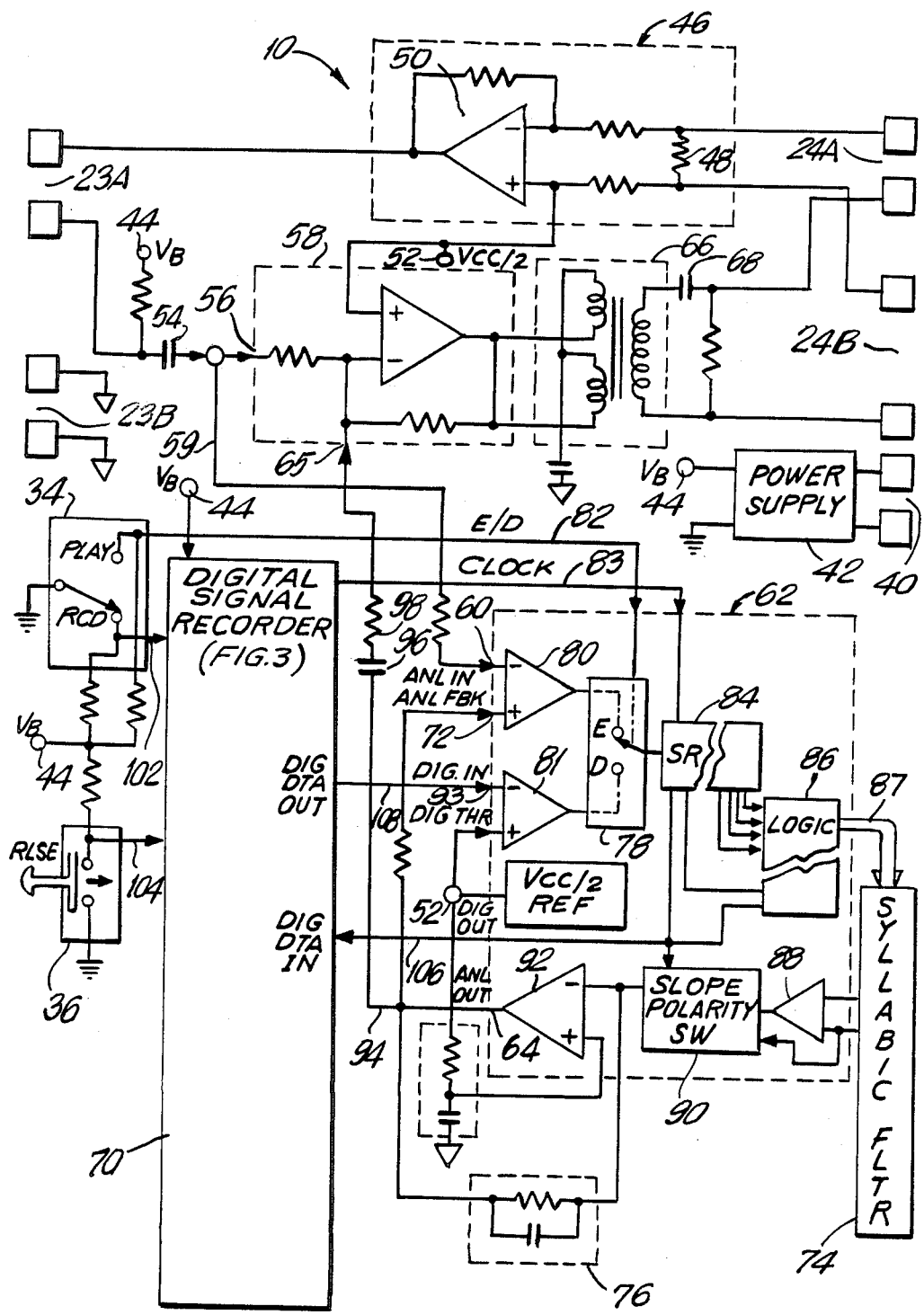
FIG. 2 is a schematic illustration of a best mode embodiment of the voice recording apparatus of FIG. 1.

FIG. 2 is a schematic of the voice recording apparatus 10 of FIG. 1. The input/output I/0 signal interface to the operator's headset is provided through terminals 23A, 23B and to the PBX console through terminals 24A, 24B. Input power is received from line 30 (FIG. 1) at terminals 40 by power supply circuitry 42. The power supply is a known type, providing a regulated VDC output voltage $V_B$, 44; typically 5 VDC for $T^2L$ recorder logic circuitry.

PBX voice signals are coupled from PBX I/O port 24 (high side 24A and low side 24B) through analog signal isolation circuitry 46 and operator I/O port 23 (high side 23A and low side 23B) to the headset earpiece 16, FIG. 1. The isolation circuitry is that known in the art, and may include line termination impedance 48 and proportional gain amplifier circuitry 50. A bias voltage (Vcc/2) 52 provides threshold biasing of the proportional gain amplifier input.

The operator's actual voice signal from the microphone (18, FIG. 1) received at operator I/O port 23 (high side 23A and low side 23B) and AC coupled through capacitor 54 to one input 56 of summing amplifier circuitry 58, and through line 59 to the analog input (ANL IN) 60 of digital signal encoding/decoding circuitry 62. The signal output of the summing amplifier, which also receives the analog output signal (ANL OUT) 64 of the encoder/decoder 62 at an input 65, is coupled through signal isolation transformer 66 and capacitor 68 to the PBX terminal 24 (high side 24A and low side 24B). The amplifier, isolation transformer, and associated circuitry, are interconnected in a manner known to those skilled in the art. The summing amplifier couples the operator's actual voice signal from terminal 23 and the operator recorded voice signal from encoder/decoder 62 to transformer 66. As shown, the operator's actual voice signal may be mixed with playback of the recorded voice signal, which must be actuated by depressing switch 36 (FIGS. 1, 2) when switch 34 is in the PLAY position.

The digital signal recorder circuitry 70 records the operator's message in an encoded digital signal format. Encoding is provided by circuitry 62 using delta modulation techniques; preferably adaptive delta modulation (ADM). As known, ADM encoding provides a bit stream of single bit samples representing the difference signal magnitude between the operator's actual voice signal (ANL IN) at input 60 and an approximation of the actual voice signal waveform provided at the (ANL OUT) 64 and coupled to ANL FBK input 72. The binary state of the samples indicates whether the difference signal has increased or decreased and this information is used to control the amplitude and polarity of ADM step voltage signals.

The approximation signal is the integral of the ADM samples and each ADM sample amplitude and polarity is varied algorithmically to allow the approximation signal to track the actual voice signal waveform. In this way the ADM sample step size is made large when the actual voice signal slope is steep and small when the slope is small. Since actual voice signal slope varies with syllable generation, ADM encoding is also known as syllabic companding. The ADM encoded signal is decoded by the same process, using the ADM encoded sample bits to control the size and polarity of the step voltage signals which are integrated to provide a "reconstructed" analog voice signal, which represents the recorded message played back to the summing amplifier 58.

In the best mode embodiment, continuously variable slope delta modulation (CVSD) syllabic companding is used. The circuitry 62 comprises known type CVSD encoder/decoder (codec) circuitry, such as the Motorola MC 3417/3418 CVSD integrated circuit (IC) modulator/demodulator, illustrated schematically. The codec is used in combination with known type syllabic filter circuitry 74 (i.e. pulse height modulator) and integrator filter 76. The ADM step voltage amplitude is varied based on the short term average of the difference signal magnitude.

Codec operation is well known. Briefly, the encoding(E)/decoding(D) operating mode is set by gate switch 78 which selects the output from one of two codec comparators 80, 81 in response to a bistable E/D signal on line 82 from RECORD/PLAY switch 34. In the RECORD position the line 82 signal is high and the gate switch selects the bistate signal output of comparator 80, which represents (high/low) the difference magnitude between the approximation signal (ANL FBK) and actual voice signal (ANL IN). The output is sampled at the frequency of the clock signal on line 83 as binary one/zero sample bits, which are shifted into register 84. Logic circuitry 86 detects the presence and number of successive equal binary state bit samples in register, i.e. "coincidence count", which is proportional to slope change. The coincidence count is presented on line 87 to the syllabic filter 74 which provides the ADM step voltage to amplifier 88 at an amplitude proportional to the product of the coincidence count value and the filter transfer function (algorithm). Polarity switch 90 responds to logic circuitry 86 to set the polarity of the ADM step signal, which is integrated by amplifier 92 and filter 76 to provide the ANL OUT equivalent signal at output 64.

In the decode mode, the output of comparator 81 is coupled to register 84. The comparator output (high/low) represents the one/zero binary state of the ADM encoded signal at the DIG IN input 93. The ADM encoded bits are handled in the same manner as the encoding sample bits to provide the reconstructed analog signal, i.e. the recorded voice signal, at ANL OUT. The encoded/decoded ANL OUT signal is provided on line 94 to the codec ANL FBK input 72 and through the high pass filter combination of capacitor 96 and resistor 98 to the second input 65 of summing amplifier 58.

The digital signal recorder 70 receives the RECORD discrete signal from switch 34 on line 102, the actuate command discrete signal from switch 36 on line 104, the regulated power supply voltage $V_B$, and the encoded ADM signal (DIG OUT) on line 106 from the codec 62. The ADM signal is received at the DIG DTA IN input of the recorder, and is "played back" to the codec from the DIG DTA OUT on line 108 in response to simultaneous switch 34 PLAY and switch 36 actuate signals.

Figure 3:
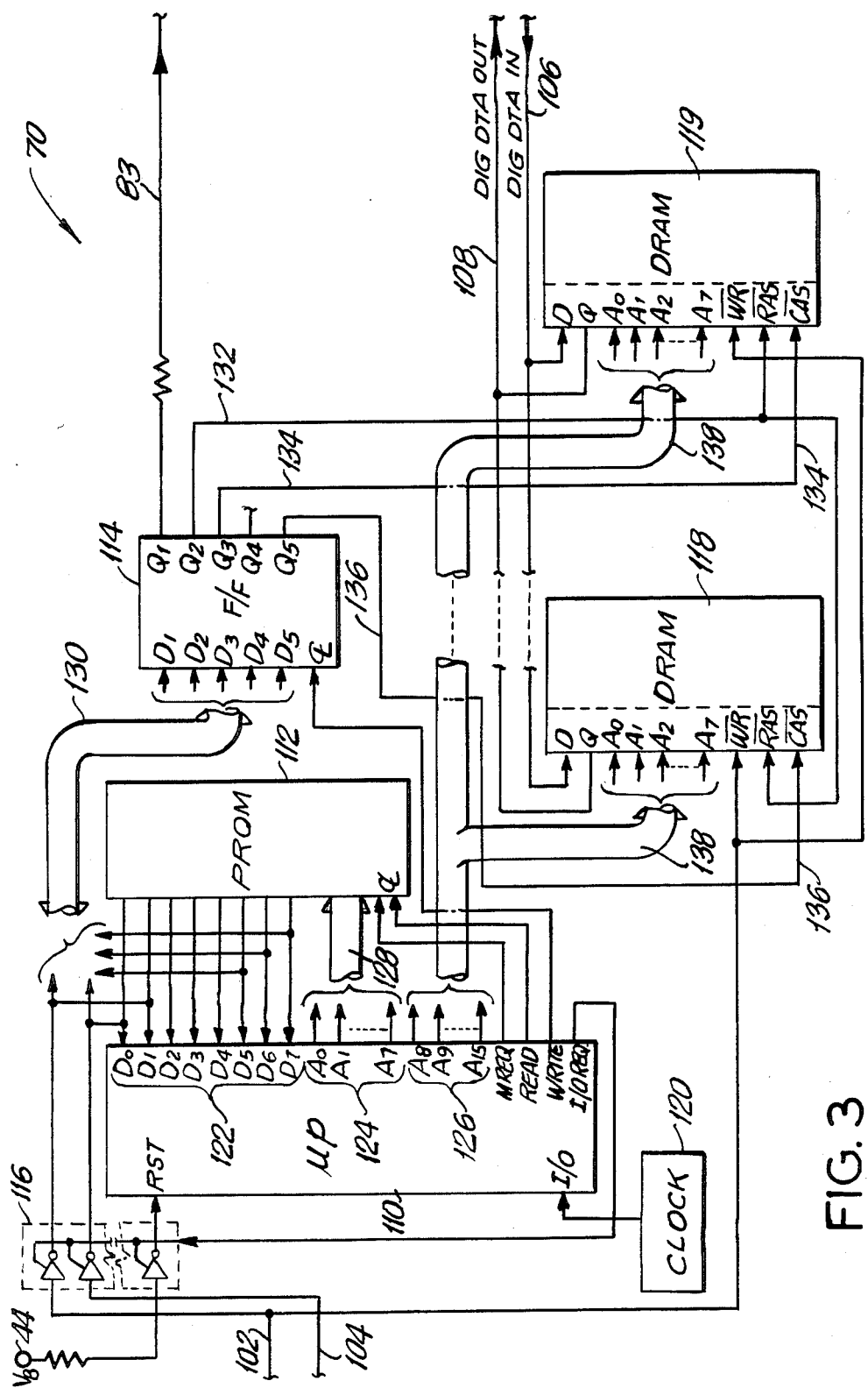
FIG. 3 is a schematic illustration of one element of the embodiment of FIG. 2.

FIG. 3 is a detailed block diagram of the digital recorder 70. The recorder includes: a signal processor 110, programmable read only memory (PROM) 112, register 114, gate switches 116, and one or more dynamic random access memories (DRAMs) 118, 119, and system clock 120. The signal processor is a known type microprocessor, such as the Mostek ® MOS MK3880 or the Zilog ®Z80 CPU, each with an eight bit ($D_0$–$D_7$) bidirectional data input/output (I/O) 122, and a sixteen bit address bus with eight bit lower address bus 124 and eight bit upper address bus 126.

The PROM 112, which is a known type, stores the operating program of the recorder's signal processor. PROM capacity for the recorder program is on the order of 256 bytes (256×8). The processor lower address bus 124 addresses the PROM through lines 128 and the program output is read out through the $D_0$–$D_7$ data lines to the processor. Selected data bits are connected through lines 130 to register 114 which latches each discrete bit signal until changed by a strobe from the processor. With the Z80 CPU the strobe is provided by the WRITE output on command of the operating program in PROM.

The register outputs include: the ADM clock signal on line 83 to the codec shift register (84, FIG. 2), a common row address strobe ($\overline{RAS}$) signal on line 132 to each of the DRAMs 118, 119, and individual DRAM column address strobe ($\overline{CAS}$) signals on lines 134, 136.

The ADM clock signal sets the codec sample frequency, which is selectable within constraints. Since the clock signal is the ADM sample bit frequency, the frequency must be high enough to provide the recorded voice message with the near fidelity of the operator's actual voice. A second constraint is the DRAM storage capacity, since each ADM sample bit is stored in DRAM. A higher clock frequency provides a higher number of sample bits per unit of recorded message real time.

The DRAMs are a known type. In the best mode embodiment each has a 64K bit (65,536×1) storage capacity, such as the Mostek ® Model MK4564(PIN/J)-15. In addition to the row and column strobe signals, each DRAM receives the signal processor's upper address bits 126 on lines 138, and the ADM signal input (DIG DTA IN) and ADM playback signal (DIG DTA OUT) on lines 106, 108 at the Q and D output/input.

The digital recorder provides high density bit storage by using the dynamic RAMs, and by including the DRAM memory cycle refresh and address multiplexing function in the operating system software. This greatly reduces the number of discrete components otherwise required. Although the recorder signal processor is a Z80 which has a built-in microprocessor refresh function, it is not used. Instead, the refresh function is real time interleaved with the recorder's operational steps, as shown in the flowchart illustration of FIG. 4.

Figure 4:
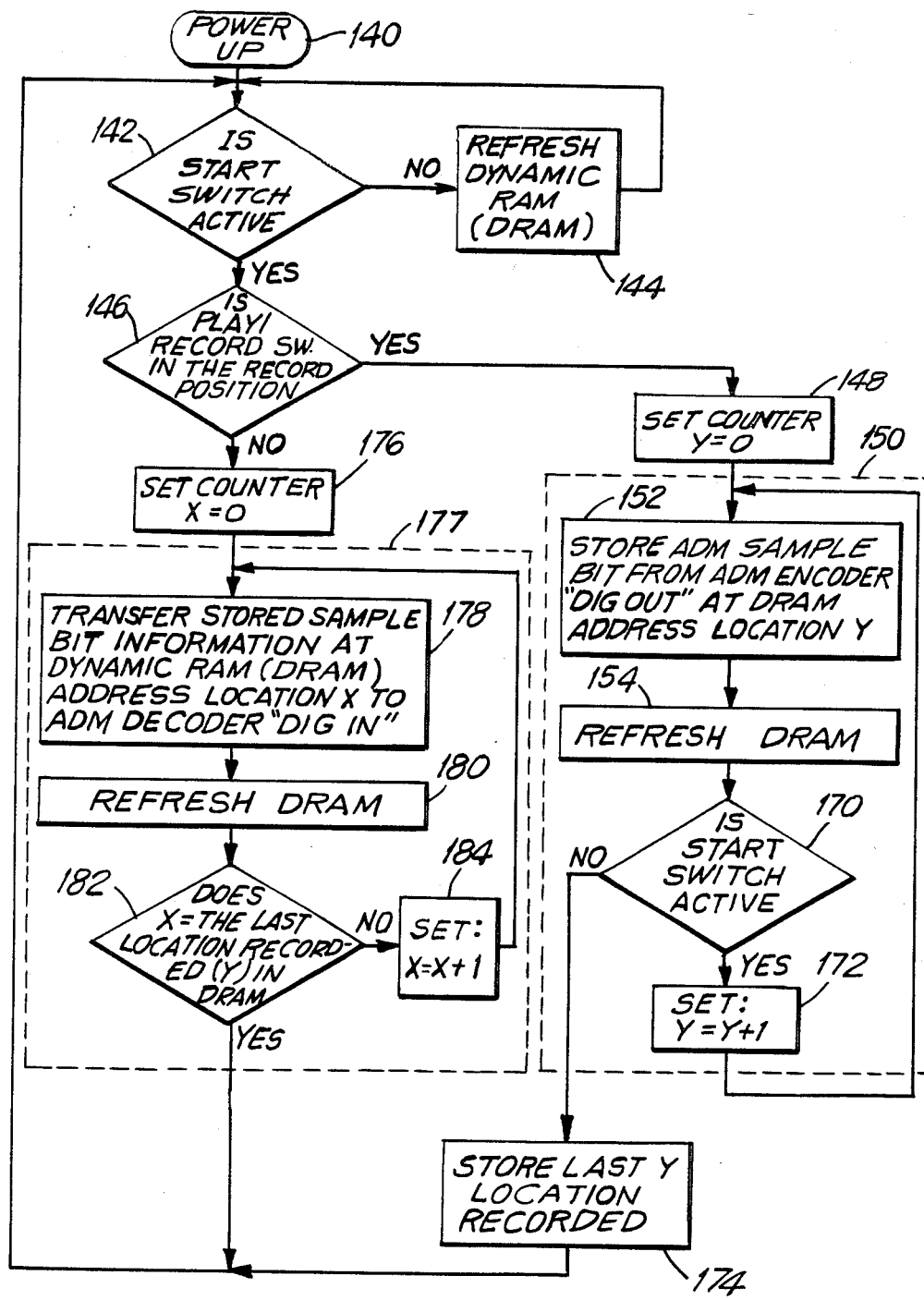
FIG. 4 is a flowchart diagram illustrating the operating steps performed by the embodiment of FIG. 2.

Referring to FIG. 4, following power up 140 the signal processor 110 executes decision 142 which determines whether the actuate switch (36, FIG. 2) is active (i.e. closed). If NO, instructions 144 require the refresh of the DRAMs, after which the processor branches back to decision 142. Refresh of the dynamic RAMs is accomplished by performing a memory cycle at each of the 128 addresses (for the 64K×1 DRAM) within each two millisecond interval. In the instruction set of FIG. 4 each refresh command provides a memory cycle for a single row. If the start switch is inactive, which is true at all times other than when recording or the start of playing back the ADM signal, the processor iterates through the loop. At each occurrence of instructions 144 it performs a memory refresh cycle at one of the DRAM row addresses.

Following a YES to decision 142, decision 146 determines if the PLAY/RECORD function switch (34, FIG. 2) is in the RECORD position. This determines which of two functional paths the recorder follows. If the answer 146 is YES the recorder stores the ADM encoded signal appearing on line 106 (DIG DTA IN); if NO the recorder plays back the stored ADM signal on line 108 (DIG DTA OUT).

In response to YES answer instructions 148 set the DRAM RECORD address counter Y to zero. The ADM serial sample bits are stored in sequence. First one DRAM is filled, then the next and so on. Since each DRAM receives the same upper address signal on lines 138, the particular DRAM being written to is selected based by the column address strobe ($\overline{CAS}$). Each DRAM receives its own $\overline{CAS}$ strobe from register 114, under control of the $D_0$–$D_7$ output data lines from the PROM 112.

The Y address count tracks the stored ADM sample bits. After setting of the Y address to zero the processor executes the RECORD routine 150. Instructions 152 store the first ADM sample bit from the codec at the first Y address location. FIG. 5 illustrates the ADM sample bit storage sequence. The processor starts the data write 153 (illustration (e)) by providing the DRAM ROW address 154 (illustration (c)) on the upper address bus lines 138 followed by the row address strobe $\overline{RAS}$156 (illustration (a)) from register 114. The $\overline{RAS}$ is common to all DRAMs. The processor next provides the column address 158 followed by the column address strobe $\overline{CAS}$160 (illustration (b)) on lines 136 (FIG. 3) to the first DRAM in the sequence. When storing the ADM sample bits the WRITE input of the DRAM is low, i.e. logic zero or $\overline{WR}$162 (illustration (d)).

During ADM playback only a data read cycle 163 (illustration (f)) is performed with the PLAY/RECORD switch in the PLAY position the WRITE input is high; as shown by the phantom waveform 164 in illustration (d). Following instructions 152 instructions 154 request a memory refresh during which one of the DRAMs 128 rows is memory cycled. During the refresh there is no column address strobe FIG. 6 shows the refresh memory cycle sequence. The processor provides the row address 166 followed by the $\overline{RAS}$168. As shown in FIG. 3 both row address and column address are provided by program control on a single set of address lines, i.e. on the Z80 upper address lines. This provides a substantial hardware savings over known techniques.

Referring again to FIG. 4, following the refresh instructions 154, decision 170 determines if the actuate switch 36 is still active. If YES, instructions 172 increment the address counter by one and the routine branches back to instructions 152 to store the next ADM sample bit. If the answer to decision 170 is NO, instructions 174 store the address of the last ADM bit sample, i.e. the last Y address location which marks the end of message, i.e. the end of message address. The program then branches back to decision 142.

Following a NO answer to decision 146, i.e. the PLAY/RECORD switch is in the PLAY position, instructions 176 set a playback address counter X to equal zero. The end of message Y address, the last ADM message sample bit, is stored in the processor main memory (instructions 174). The X counter counts the number of ADM bits being read out of DRAM, i.e. the playback signal bits; comparing the X count value to the last address stored value to detect the end of message.

Following instructions 176 the processor executes the message playback routine 177. Instructions 178 read the first playback message signal bit stored at location X=0. This is the first stored bit of the stored voice message. Following the first bit read, instructions 180 executes a memory refresh cycle (FIG. 6). A decision 182 next determines if the X count equals the end of message address. If NO, instructions 184 increment the X count and the routine branches back to instructions 178. If YES the playback routine is completed and the processor branches back to decision 142.

In the best mode embodiment the system clock, i.e. the processor clock signal, is 4 MHZ. The codec ADM sample frequency on line 83 is on the order of 32K BPS and DRAM capacity is approximately 128K bits (i.e. two 64K×1bit DRAMs). This provides a nominal message recording length of 3.6 seconds. Longer message recording times may be provided by adding DRAM capacity, by reducing the codec sampling frequency (and decreasing the processor clock signal frequency), or some combination of both.

The digital voice recording apparatus of the present invention provides a minimum cost-per-bit storage factor. This is accomplished by economies in functional design; using adaptive delta modulation encoding techniques, dynamic random access memory storage, and placing the DRAM memory refresh and address multiplexing function in the recorder's operating system software. The maximum message recording length is easily extended, using additional memory without added control hardware.

The voice recorder may be used with any type of telephone PBX system analog or digital. It is fully adaptable to extended recording times and totally flexible in operation. When installed its use is optional with the operator, on a per call basis. The operator may talk through the unit, or very easily disconnect the unit and reconnect her headset at any time, such that in the event of failure PBX reliability is unaffected.

Although the invention has been shown and described with respect to a best mode embodiment thereof, it should be understood by those skilled in the art that various other changes, omissions, and additions may be made therein without departing from the spirit and scope of the invention.

Having thus described a best mode embodiment of the present invention that which we claim as new and desire to secure by Letters Patent is:

1. Apparatus for exchanging voice information between a PBX operator's microphone and receiver and a PBX switching matrix, comprising:

analog signal input/output (I/O) interface means responsive to the operator's microphone and to the PBX switching matrix, for presenting voice signals from the PBX switching matrix to the operator's receiver and for presenting voice signals from the operator's microphone and recorded voice messages from a signals recording means to the PBX switching matrix;

said analog signal input/output (I/O) interface means comprising signal conditioning circuitry including signal summing means responsive at each of two inputs to actual voice signals from the operator's microphone and to recorded voice messages from said signal recording means, for presenting each of said voice signals to the PBX switching matrix;

said analog signal input/output (I/O) interface means including means to provide full duplex exchange of voice signals between said PBX switching matrix and the operator's microphone and receiver;

mode switch means, operable in a first mode and a second mode, alternately, in response to operator selection;

actuating switch means, operable in an off state and on statge, alternately, in response to operator selection;

signal recording means, responsive to said mode switch means, said actuating switch means, and to said analog signal input/output (I/O interface means, for message recording the operator's voice signals in response to said mode switch means being in said first mode in the presence of said actuating switch means being in said on state, and for presenting said recorded messages to said analog signal input/output (I/O) interface means in response to said mode switch means being in said second mode in the presence of said actuating switch means being in said on state.

2. Apparatus for exchanging voice information between a PBX operator's microphone and receiver and a PBX switching matrix, comprising:

analog signal input/output (I/O) interface means, responsive to the operator's microphone and to the PBX switching matrix, for presenting voice signals from the PBX switching matrix to the operator's receiver and for presenting voice signals from the operator's microphone and recorded voice messages from a signal recording means to the PBX switching matrix;

mode switch means, operable in a first mode and a second mode, alternately, in response to operator selection;

actuating switch means, operable in an off state and on state, alternately, in response to operator selection;

signal recording means, responsive to said mode switch means, said actuating switch means, and to said analog signal input/out, (I/O) interface means, for message recording the operator's voice signals in response to said mode switch means being in said first mode in the presence of said actuating switch means being in said on state, and for presenting said recorded messages to said analog signal input/output (I/O) interface means in response to said mode switch means being in said second mode in the presence of said actuating switch means being in said on state;

said signal recording means comprising codec signa means for encoding operator analog voice signals from said analog signal input/output (I/O) interface means into equivalent digital recording signals in the presence of said mode switch means in said first mode, and for decoding digital recording signals from a digital signal recording means into equivalent operator analog voice signals at said analog signal input/output (I/O) interface means in the presence of said mode switch means in said second mode; and, digital signal recording means, responsive to said digital recording signals, and including signal processing means and memory means for storing signals, said signal processing means responsive to said mode switch means and said actuating switch means, for storing in said memory means said digital recording signals from said codec means in response to said mode switch means in said first mode in the presence of said actuating switch means in said on state, and for retrieving and presenting to said codec means said digital recording signals stored in said memory means in response to said mode switch means in said second mode in the presence of said actuating switch means in said on state.

3. The apparatus of claim 2, wherein said codec signal means comprises circuitry for delta modulation encoding.

4. The apparatus of claim 2, wherein said codex signal means comprises circuitry for adaptive delta modulation encoding.

5. The apparatus of claim 2 wherein:

said memory means for storing signals comprises dynamic random access memory means, each responsive to memory refresh signals presented periodically thereto for maintaining in storage said digital recording signals; and said signal processing means includes program memory means for storing program operating signals for controlling said signal processing means in the operation of said digital signal recording means, said program operating signals including said memory refresh signals for providing said memory refresh signals periodically to siad dynamic random access memory means.

* * * * *